(12) United States Patent
Telfer et al.

(10) Patent No.: US 10,924,365 B2
(45) Date of Patent: Feb. 16, 2021

(54) METHOD AND SYSTEM FOR GENERATING DIRECTED GRAPHS

(71) Applicant: INETCO SYSTEMS LIMITED, Burnaby (CA)

(72) Inventors: Angus Richard Telfer, Vancouver (CA); Thomas Bryan Rushworth, Manning Park (CA)

(73) Assignee: INETCO SYSTEMS LIMITED, Burnaby (CA)

( * ) Notice: Subject to any disclaimer, the term of this patent is extended or adjusted under 35 U.S.C. 154(b) by 692 days.

(21) Appl. No.: 13/887,241

(22) Filed: May 3, 2013

(65) Prior Publication Data

US 2014/0330956 A1   Nov. 6, 2014

(51) Int. Cl.
*H04L 12/26* (2006.01)
*H04L 12/24* (2006.01)
(Continued)

(52) U.S. Cl.
CPC ............ *H04L 43/04* (2013.01); *G06F 11/006* (2013.01); *G06F 11/3466* (2013.01); *H04L 41/0253* (2013.01); *H04L 41/069* (2013.01); *G06F 11/3096* (2013.01); *G06F 2201/86* (2013.01); *G06F 2201/865* (2013.01); *G06F 2201/87* (2013.01); *H04L 12/2818* (2013.01)

(58) Field of Classification Search
CPC ... H04L 29/08072; H04L 29/06; H04L 43/00; H04L 12/2602; H04L 41/22
See application file for complete search history.

(56) References Cited

U.S. PATENT DOCUMENTS 7,769,682 B2   8/2010   Moudgal
8,051,330 B2   11/2011  Cinato et al.
(Continued)

OTHER PUBLICATIONS

International Searching Authority (ISA/CA), International Search Report and Written Opinion, dated Jun. 17, 2014, for corresponding International Patent Application No. PCT/CA2014/000284.
(Continued)

*Primary Examiner* — Hua Fan
*Assistant Examiner* — Hien V Doan
(74) *Attorney, Agent, or Firm* — Conneely PC; Joseph Conneely

(57) ABSTRACT

A method for generating a directed graph for a transaction in an application, comprising: receiving event information for events included in the transaction at a processor, each event having a link directed from a first endpoint to a second endpoint in the application; assigning an identification ("ID") number to each event and including the ID number in the event information for each event; based on endpoint, correlating the event information to produce dyadic event information representative of dyadic events, each dyadic event including a first event and a second event associated with the endpoint, the dyadic event information for each dyadic event including a first ID number and a second ID number for the first event and the second event, respectively; based on ID number, combining the dyadic event information to produce correlation fragments associated with the ID number; and, combining the correlation fragments to produce the directed graph for the transaction.

18 Claims, 7 Drawing Sheets

(51) Int. Cl.
  _G06F 11/00_   (2006.01)
  _G06F 11/34_   (2006.01)
  _G06F 11/30_   (2006.01)
  _H04L 12/28_   (2006.01)

(56) References Cited

U.S. PATENT DOCUMENTS

| | | | |
|---|---|---|---|
| 8,234,631 | B2 | 7/2012 | Greifeneder et al. |
| 2005/0182708 | A1* | 8/2005 | Moudgal ............... G06Q 40/025 705/38 |
| 2005/0203820 | A1* | 9/2005 | Dweck ................. G06Q 20/405 705/35 |
| 2008/0235366 | A1* | 9/2008 | Telfer et al. .................. 709/224 |
| 2009/0292948 | A1* | 11/2009 | Cinato et al. .................... 714/26 |
| 2010/0313202 | A1 | 12/2010 | Wilkins |
| 2011/0035429 | A1* | 2/2011 | Dempo ............. G06F 17/30516 709/201 |
| 2011/0087854 | A1* | 4/2011 | Rushworth et al. .......... 711/170 |
| 2012/0072887 | A1* | 3/2012 | Basak .................... G06F 11/323 717/123 |
| 2012/0179740 | A1 | 7/2012 | Shaqed et al. |

OTHER PUBLICATIONS

Bin Shao, et al., "Managing and Mining Large Graphs: Systems and Implementations", SIGMOD '12, May 20-24, 2012, Scottsdale, Arizona, USA.
European Patent Office, Extended European Search Report, dated Dec. 16, 2016, for corresponding European Patent Application No. 14792023.5.
European Patent Office, Examination Report, dated Jan. 31, 2018, for corresponding European Patent Application No. 14792023.5.

* cited by examiner

METHOD AND SYSTEM FOR GENERATING DIRECTED GRAPHS

FIELD OF THE INVENTION

This invention relates to the field of directed graphs, and more specifically, to a method and system for generating directed graphs for application performance monitoring.

BACKGROUND OF THE INVENTION

Many businesses and organizations use complex, network distributed applications. These applications may be employed as part of the internal operation of the business, as a product or service offered to customers, or as part of a larger system involving other businesses and organizations. Distributed applications often have complex topologies that include remote data-centers, third party services, cloud-based components, mobile and Web-based interfaces, and globalized infrastructure. These applications often have multiple distinct functional tiers, implement a range of different protocols, and use hardware and software from a variety of different vendors.

In order to manage and maintain complex distributed applications, different strategies have been employed. According to one strategy, network communications between nodes are monitored. In this approach, exchanges of data and/or messages characterize the individual nodes and their relationship to each other.

Depending on the type of application, a particular exchange of data may correspond to the execution of a particular task. Such an exchange of data may be identified as a type of transaction. Monitoring and analyzing the transactions between nodes provides critical information about the operation and performance of the individual nodes and of the overall distributed application.

For an application performance monitoring system to operate in real-time on network traffic from a large distributed application, very high volumes of network data must be processed. Real-time analysis must efficiently operate on the network data without losing information, generating incorrect or incomplete results, exceeding the capacity of the resources being used for monitoring, or impacting the application that is being monitored. Efficient mechanisms are required for data monitoring, recording, analysis, storage and retrieval. Such mechanisms are often lacking in existing systems.

In particular, there is a set of problems that share the following characteristics. First, a transaction or event "A" results in a number of events (say "B" and "C"), each of which results in a number of events (say "D", "E", and "F"), etc. Second, on passing between any two "connected" events (e.g., between "A" and "B") the event is modified such that it may be directly determined that event "A" is "connected" to event "B" as the modification is small between the two adjacent events. However, it is impossible to directly determine that event "A" is connected to event "D" as by this point the modification has become too large to be able to determine that there is a relationship between the two. Note that in the preceding, "A" through "F" refer to events rather than nodes.

Some examples of this type of problem include the following. First, the problem may arise when determining the spread of news or rumors through social media such as when an individual uses Twitter™ to send a news item, which others may receive and refer to in blog entries, news articles, Facebook™, emails, text messages, etc., and which still others may read and refer to using their media of choice, etc. Note that this may be considered as a modern variation of the old game of "telephone" where a message is passed from person to person until, at the end of the line, when the final message is compared to the original message it is found to be significantly different. Second, the problem may arise when determining the root cause of a problem that cascades into multiple "downstream" problems as with networked computer systems, with vehicle traffic problems, etc. Here, small perturbations may result in numerous larger and different problems at widely distributed points in the overall system. Third, the problem may arise when determining the flow of data of application transactions that involve many servers where a request may be received from one server (e.g., a web server), which may forward parts of the message (formatted in different fashions) to different application servers needed for satisfying parts of the request, which may continue the process to other servers, etc. Fourth, the problem may arise when monitoring the movement of individuals in the absence of any single tracking mechanism (i.e., clothing may change, the trackable devices being carried may change, facial features may not always be detectable, etc.). Fifth, the problem may arise when monitoring the traffic pattern of individual vehicles on a road system in the absence of any single "tag" that may be used to track the vehicles. Sixth, the problem may arise when examining the small genetic changes that take place between generations (i.e., genetic drift) and so determining how viruses, bacteria, and other living organisms evolve and so how speciation occurs.

In these examples, the relationships between items may be described by directed graphs. The characteristics of these graphs are as follows. First, they are directed. Second, they are connected. Third, the outgoing edges of nodes are strictly ordered. Fourth, the same node may be transversed multiple times (e.g., see FIG. 3). Fifth, the sequencing of occurrence of the different edges are known (e.g., by time stamping, sequence numbering, etc.). Sixth, the graph cannot be constructed except by individually examining adjacent edges. Seventh, a large number of graphs have to be created concurrently (e.g., this is not a matter of mapping a road system, it is a matter of tracking the movement of many vehicles simultaneously).

With existing methods, the assembly of directed graphs may be accomplished effectively as long as there is little in the way of latency requirements or there is ready availability of large amounts of data storage and computing power. In these cases, processors may access data as required until the final graphs are produced. However, these methods do not work in cases where there are low latency requirements, a limitation in computing power, a limitation in data storage, and/or where storing of the data is problematic due to security or regulatory concerns.

In particular, the assembly of directed graphs becomes more difficult when the following conditions exist. First, there is a mutation of the data between the adjacent edges such that only adjacent edges may be directly related. Second, a large number of simultaneous, interrelated graphs exist that cannot be split into separate groups for processing. Third, there is access to limited computing power and/or data storage. Fourth, there is a requirement for low latency.

Existing methods for directed graph assembly include the following. First, inserting all the events into a single large database using a scalable analytics system such as Hadoop™ to examine the applicable part of the database looking for matches. Second, using stochastic techniques to provide a probabilistic solution to the problem either via accessing a large database or by working with a statistical representation of the data. Third, avoiding the entire issue of mutating events by tagging them in some fashion that survives the many transversals through the system (e.g., watermarking, providing some form of steganography, putting a geographical positioning system ("GPS") receiver in a vehicle, etc.). Fourth, breaking the problem down into components that do not intersect so that the size of each component may be addressed by a single vertically scalable processor or database.

While existing methods for the assembly of directed graphs exist, they are problematic when they are used in situations where there are massive amounts of data, a real requirement for low latency, and a task must be carried out using limited computing and data storage facilities. This is particularly the case when generating graphs to represent transaction flows that involve many servers. For example, where a request may be received from one server (e.g., a web server), which may forward parts of the request (formatted in different ways) to different application servers needed for satisfying the request, which may continue the process to other servers, etc. In this example, real-time assembly of the individual graphs becomes a requirement for the following reasons. First, for alerting operators of any degradation or abnormal behaviour in a network. Second, for detecting and alerting operators regarding any unauthorized activity. Third, for identifying the root cause of a problem or abnormal behaviour in a network. Fourth, on detection of a problem, to allow operators to immediately "drill down" into specific transactions to further analyze the issues.

A need therefore exists for an improved method and system for generating directed graphs for application performance monitoring. Accordingly, a solution that addresses, at least in part, the above and other shortcomings is desired.

SUMMARY OF THE INVENTION

According to one aspect of the invention, there is provided a method for generating a directed graph for a transaction in an application, comprising: receiving event information for events included in the transaction at a processor, each event having a link directed from a first endpoint to a second endpoint in the application; assigning an identification ("ID") number to each event and including the ID number in the event information for each event; based on endpoint, correlating the event information to produce dyadic event information representative of dyadic events, each dyadic event including a first event and a second event associated with the endpoint, the dyadic event information for each dyadic event including a first ID number and a second ID number for the first event and the second event, respectively; based on ID number, combining the dyadic event information to produce correlation fragments associated with the ID number; and, combining the correlation fragments to produce the directed graph for the transaction.

In accordance with further aspects of the present invention there is provided an apparatus such as a data processing system, a method for adapting same, as well as articles of manufacture such as a computer readable medium or product and computer program product having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXEMPLARY EMBODIMENTS

Figure 1:
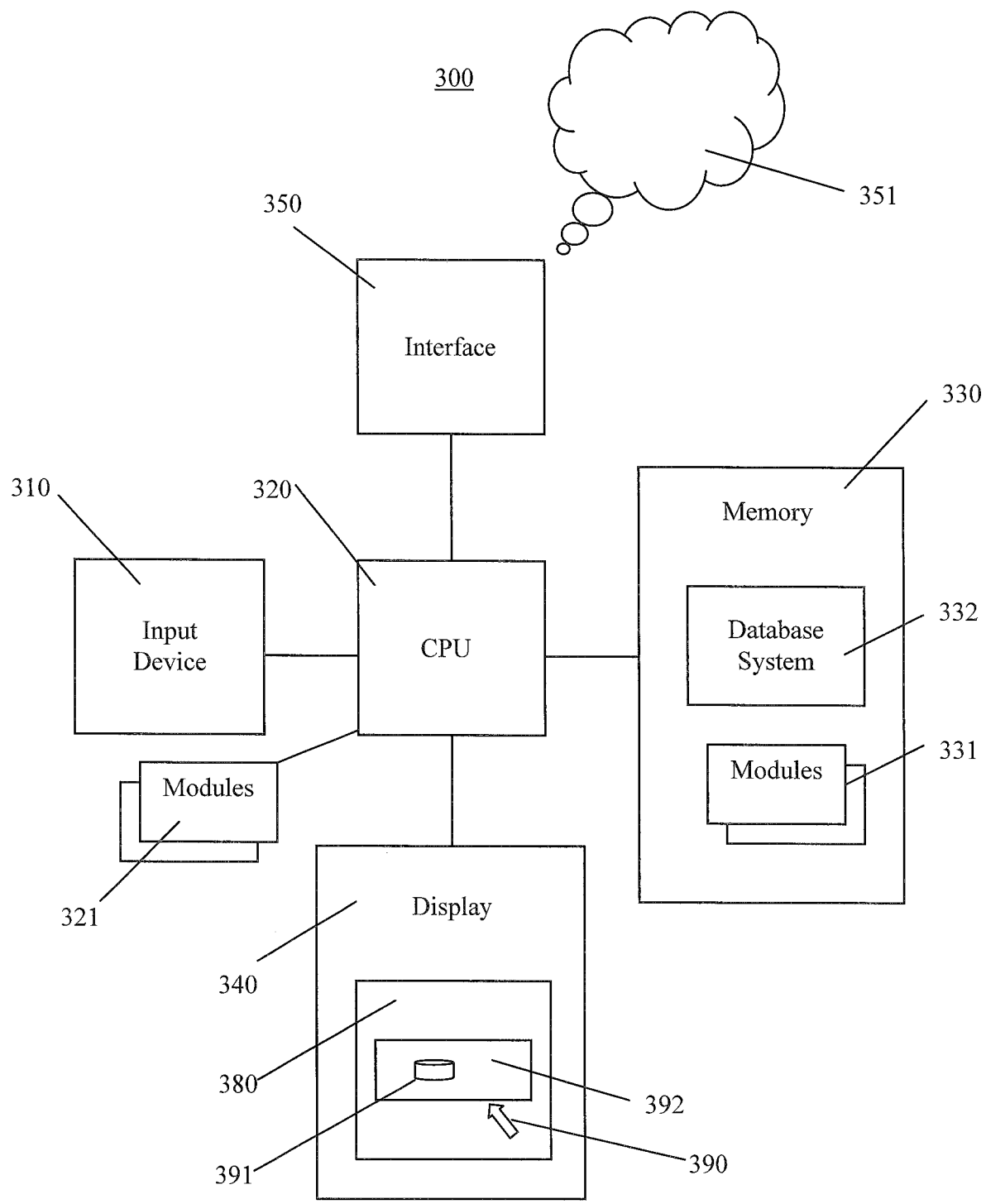
FIG. 1 is a block diagram illustrating a data processing system in accordance with an embodiment of the invention.

In the following description, details are set forth to provide an understanding of the invention. In some instances, certain software, circuits, structures and methods have not been described or shown in detail in order not to obscure the invention.

The term "data processing system" is used herein to refer to any machine for processing data, including the computer systems, wireless devices, routers, correlators, collectors, handlers, and network arrangements described herein.

The term "event" is used herein to refer to a point-to-point activity that is detected by an "event collector". Examples of events include emails, messages, etc. Events are correlated into a directed graph as described below. Note that events have associated with them their source and destination endpoints (i.e., a "link" as defined below). Each event includes the following. First, a link name. This provides a reference to the producer, the consumer, and to any properties of the link as defined in the link description below. Second, one or more timestamps identifying when the event occurred. Third, an event identifier ("Evnt-ID", where "Evnt" represent "event" and "ID" represents "identification") as described with respect to the operation of the event collector below. Fourth, other data in the collected event as required for downstream processing or display.

The term "link" is used herein to refer to or to define the source and destination points and any immutable properties of the path between the two (e.g., protocol stack). An event initiates at one application/entity and terminates at another application/entity. Events occur over links. In the example of a single email in an email chain, the link is defined by the sender and receiver of that email and the protocol stack, while the event is the email and its associated link. Each link includes the following. First, a system wide unique link name. Second, an optional producer. Third, a consumer. Fourth, other immutable properties of the link that, when combined with the producer and consumer, uniquely describe the link.

The term "singleton event" is used herein to refer to a transaction that occurs over a single link. It does not need to be correlated with events on any other links.

The term "dyadic event" ("DEvent" or "devent") is used herein to refer to a two-link event. In graph terminology, an event may be thought of as a "node-edge-node" chain where the nodes define the endpoints of an event. The combination of two of these chains that share a common node where the common node is the consumer in one chain and the producer in the other chain forms a "node-edge-node-edge-node" chain. Such a chain involving two edges is referred to herein as a dyadic event or, alternatively, as a "two-link event". A dyadic event consists of an ordered pair of events ("Evnts"). The individual links are referred to herein as "devent[0]" and "devent[1]".

The term "correlation fragment" is used herein to refer to any graph fragment consisting of two or more events from dyadic events. The creation of a full directed graph involves the connecting of events into dyadic events and eventually into a complete graph. A correlation fragment includes the following. First, a connected graph of events and their connecting nodes. Second, the graph starting point. Third, a version number. Fourth, an optional set of "graph correlator" addresses, one for each graph correlator that the correlation fragment has come in contact with.

The term "signature" is used herein to refer to a canonical ordering of the node and link names from the events contained within a correlation fragment. An example of such a canonical ordering would be a depth first walk of the graph starting at the starting point of the correlation fragment and traversing out going edges in order.

The term "application performance monitoring" ("APM") is used herein to refer to monitoring of the performance and availability of computer software applications.

The term "Evnt-ID" is used herein to refer to a unique identifier assigned to each observed event. It consists of a combination of a collector identification ("CID") and a locally unique sequence number.

The term "protocol data unit" ("PDU") is used herein to refer to the lowest unit of contiguous data passed over a communications link.

The term "shard" is used herein to refer to dividing work or data up so that more processors may work on it. Sharding allows for scaling a system up.

The term "transaction" is used herein to refer to a complete directed graph consisting of one or more correlated events.

The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

FIG. 1 is a block diagram illustrating a data processing system 300 in accordance with an embodiment of the invention. The data processing system 300 is suitable for network message monitoring and analysis, transaction monitoring and analysis, directed graph generation, and for generating, displaying, and adjusting presentations in conjunction with a user interface or a graphical user interface ("GUI"), as described below. The data processing system 300 may be a client and/or server in a client/server system (e.g., 400). For example, the data processing system 300 may be a server system or a personal computer ("PC") system. The data processing system 300 may also be a mobile device or other wireless, portable, or handheld device. The data processing system 300 may also be a distributed system which is deployed across multiple processors. The data processing system 300 may also be a virtual machine. The data processing system 300 includes an input device 310, at least one central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a datastore or database system 332 for storing data and programming information. The database system 332 may include a database management system and a database and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium (or product) (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium (or product) that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 2:
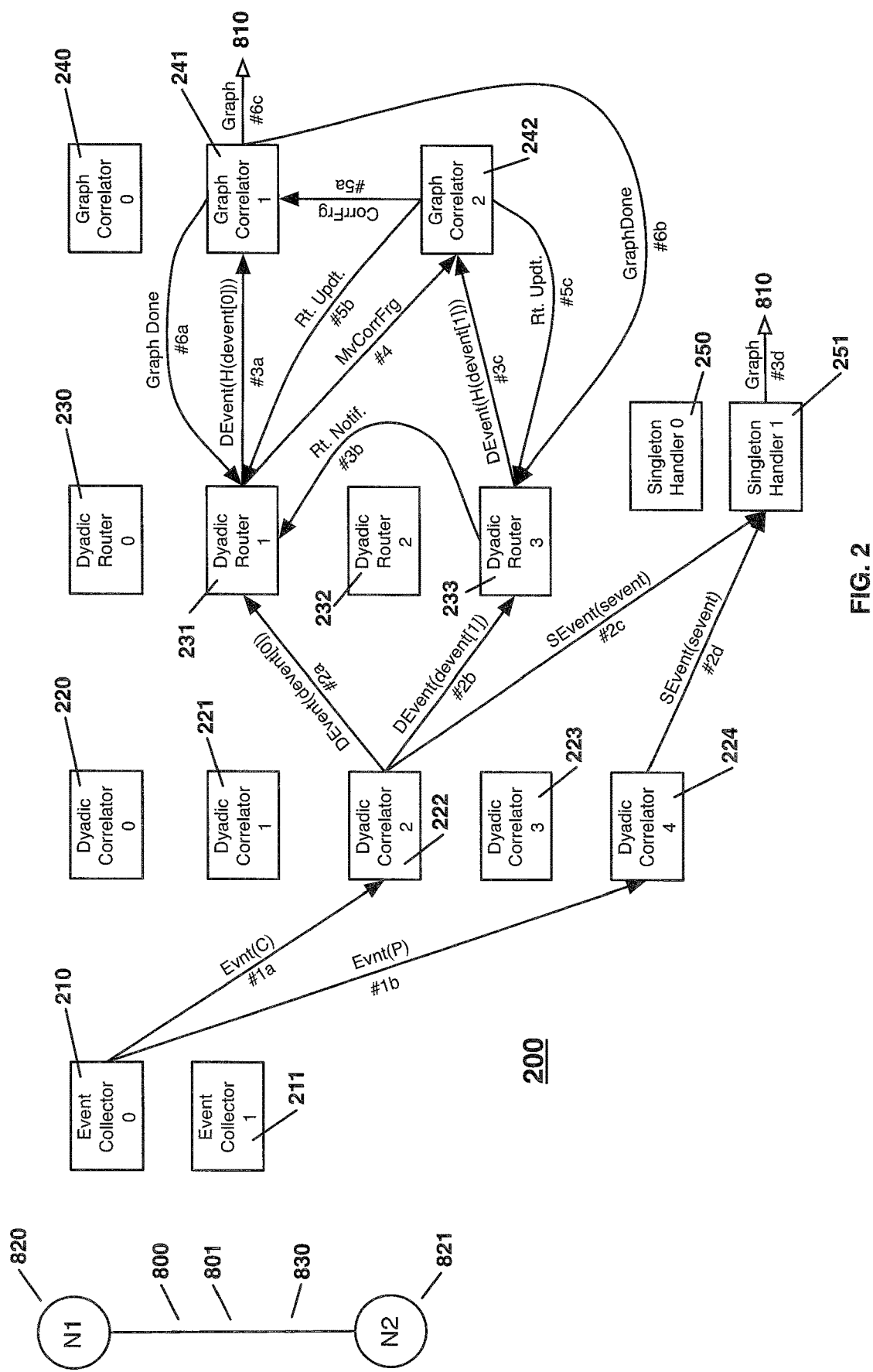
FIG. 2 is a block diagram illustrating an event processing system in accordance with an embodiment of the invention.

FIG. 2 is a block diagram illustrating an event processing system 200 in accordance with an embodiment of the invention. According to one embodiment, and referring to FIG. 3, related events 830 of a transaction 800 in an application 801 are processed by the system 200 to form a directed graph 810 representing the causal relationship between the events 830. FIG. 2 shows the different components 210, 220, 230, 240, 250 involved with the processing and how data flows between them. The invention is advantageous in environments involving large amounts of distributed data. As such, generally, the event collectors 210, 211 are widely distributed, the dyadic correlators 220, 221, 222, 223, 224 are regionally distributed, and the dyadic routers 230, 231, 232, 233 and graph correlators 240, 241, 242 are more centrally located (i.e., where higher performance networks and processors are available). However, this distribution is not a requirement and all of the components of the event processing system 200 may be widely distributed or, indeed, centralized in a single data processing system 300. For example, the components 210, 220, 230, 240, 250 shown in FIG. 2 may represent software modules 331 and/or hardware modules 321 within the data processing system 300 of FIG. 1. Alternatively, one or more of the components 210, 220, 230, 240, 250 may be configured similarly to the data processing system 300 of FIG. 1. According to one embodiment, in the operation of the various components of the system 200, messages may be sent in any order after their content is available.

With respect to FIG. 2, the following should be noted. First, in labels of the form "#digit-letter", the digit denotes the message sequence and the letter defines it as a unique message. Second, parenthesized values in the labels (e.g., "devent[0]") denote information used for routing. Third, "Evnt(P)" denotes routing based on the producer, while "Evnt(C)" denotes routing based on the consumer. Fourth, "H(devent[0])" denotes the recent history of the first event in the dyadic event. Fifth, "DEvent" denotes a dyadic event. Sixth, "devent[0]" and "devent[1]" denote the first 841 and second 842 components of a dyadic event 840 (see FIG. 3). Seventh, "CorrFrg" is a correlation fragment (i.e., two or more correlated events).

The event collectors 210, 211 are responsible for detecting the events 830 that are to be correlated into a directed graph 810. These events 830 may be transactions, emails, messages, etc. In some embodiments, the event collectors 210, 211 may perform some processing to merge individually detected events into a meta-event (e.g., in the case of APM, individual PDU's may be combined into a message, and messages may be combined into low level service transactions). The event collectors 210, 211 contain the following. First, a list of links they obtain events from along with the actual link information described above. Second, a list, table or map of which dyadic correlators 220, 221, 222, 223, 224 are handling any producer or consumer referenced by any of the links. Third, a system wide unique collector ID ("CID") assigned at start-up.

Dyadic correlators 220, 221, 222, 223, 224 create dyadic events 840 by linking two events 841, 842 with a common endpoint (i.e., consumer by one and producer by another) 843 together. As such, they may be thought of as two-link correlators. Dyadic correlators 220, 221, 222, 223, 224 maintain the following. First, a mapping of producers to sets of currently active events which have that producer ("evnts_by_producer"). Second, a mapping of consumers to sets of currently active events which have that consumer ("evnts_by_consumer"). Events that do not get correlated within a timeout period are sent to singleton handlers 250, 251 based on a function calculated on the Evnt-ID of the single event.

Singleton handlers 250, 251 determine if a singleton event has occurred (i.e., a directed graph 810 consisting of a single link) by receiving two copies of it from the dyadic correlators 220, 221, 222, 223, 224. A single copy being received without a subsequent second copy indicates that the other copy was correlated into a dyadic event. In this case, the event is not a singleton and will be discarded. Singleton handlers 250, 251 maintain a mapping of Evnt-ID's to events.

Dyadic routers 230, 231, 232, 233 determine the best graph correlator 240, 241, 242 to send a dyadic event 840 to and send it to that graph correlator 240, 241, 242 for processing. Dyadic routers 230, 231, 232, 233 maintain a recent history map of "Evnt-ID"-to-"<GCaddr, version>" pairs. The address part of a pair is the address of the graph correlator 240, 241, 242 which last received dyadic events containing the Evnt-ID and the version part of the pair is used to manage address changes.

Graph correlators 240, 241, 242 create the final directed graph 810 by matching the events 841, 842 in the dyadic events 840 to existing correlation fragments or by starting new correlation fragments. Graph correlators 240, 241, 242 maintain the following. First, a set of correlation fragments. Second, a fragments-by-Evnt-ID map of Evnt-IDs to correlation fragments. Third, a forwarding map of "Evnt-IDs"-to-"<GCaddr, version>" pairs.

In operation, upon obtaining an event ("Evnt") 830, an event collector 210 performs the following operations. First, it generates a locally unique sequence number "CSeq" (e.g., by incrementing a counter). It then generates an event ID ("Evnt-ID") by combining a system wide unique collector CID with the CSeq. The Evnt-ID is associated with the event 830. Second, it decides where to send the event 830 by examining the producer ("P") 820 and consumer ("C") 821 nodes or endpoints of the event 830 by performing the following. First, looking up the event's producer node 820 in a node-to-"Dyadic Correlator" table and looking up the event's consumer node 821 in the node-to-"Dyadic Correlator" table. Second, if the same dyadic correlator is found for both producer and consumer 820, 821, sending the event 830 and a "both" indicator [both,Evnt] to the dyadic correlator. Third, otherwise, sending 1a, 1b the same event 830 to both the dyadic correlators 222, 224 with an indication of the appropriate position (i.e., "first" or "last") to indicate the link ends or endpoints 820, 821 to be considered.

With respect to the dyadic correlators 220, 221, 222, 223, 224, messages 1a, 1b coming from the event collectors 210, 211 consist of an event with attached Evnt-ID and a position (i.e., "first", "last", or "both"). Routing from this stage on is based on a function of the Evnt-ID rather than the producer and consumer information. This function may be denoted as "DRaddr(Evnt-ID)". Depending on the implementation, it may take several forms, two of which are as follows. First, the Evnt-ID may be a number modulo the number (e.g., 4) of dyadic routers 230, 231, 232, 233. Second, the K low order bits of the Evnt-ID may be used. The important point is that the function used be easily calculated, meaning that the function does not have to be passed on if the constituent parts are passed on. Note that these functions effectively "shard" the work to be performed by the dyadic routers 230, 231, 232, 233.

Upon receiving a message 1a, 1b including position ("posn") and event information (e.g., [posn, cur_evnt]) from an event collector 210, the dyadic correlator 222 will, first, update the two maps of producers/consumers to sets of events. Second, the dyadic correlator 222 will perform the operations listed in Appendix "A" below to identify any correlations (where cur_evnt means current event, prv_evnt means previous event, and nxt-evnt means next event) and to create dyadic events.

In particular, the dyadic correlator 222 will identify any correlations and create the corresponding dyadic events by examining the maps of producers/consumers for whichever (either one or both) of the producer and consumer of the current event are being handled by the dyadic correlator 222 (indicated by "posn") as follows. If both the producer and consumer are being handled by the dyadic correlator 222 they may be handled in any order. If posn is "last" or "both", then the dyadic correlator 222 is handling the producer of the current event. The dyadic correlator 222 obtains a set of candidate events (candidates) that might correlate with the current event as the preceding or previous event from its "evnts_by_consumer" map with the producer of the current event as the key. All events in the candidate set have the producer of the current event as their consumer. For each candidate previous event in the candidate set, the dyadic correlator 222 examines the "other data" in both the candidate previous event and the current event. If that other data implies correlation (in a manner not described herein), then the dyadic correlator 222 creates a new dyadic event consisting of the previous event followed by the current event, and sends the dyadic event to the dyadic routers 231, 233 as described below. If posn is "first" or "both", then the dyadic correlator 222 is handling the consumer of the current event. The dyadic correlator 222 obtains a set of candidate events (candidates) that might correlate with the current event as the following or next event from its "evnts_by_producer" map with the consumer of the current event as the key. All events in the candidate set have the consumer of the current event as their producer. For each candidate next event in the candidate set, the dyadic correlator 222 examines the "other data" in both the current event and the candidate next event. If that other data implies correlation (in a manner not described herein), then the dyadic correlator 222 creates a new dyadic event consisting of the current event followed by the next event, and sends the dyadic event to the dyadic routers 231, 233 as described below.

Third, the dyadic correlator 222 will perform the operations listed in Appendix "B" below to send 2a, 2b each dyadic event ("devent") 840 to the appropriate dyadic routers 230, 231, 232, 233.

In particular, for each dyadic event ("devent") 840, the dyadic correlator 222 will determine one or two appropriate dyadic routers 230, 231, 232, 233 to send 2a, 2b the dyadic event 840 to. The appropriate dyadic router(s) are determined by calculating a simple function ("DRaddr(x)") on each of the Evnt-ID's of the events in devent. The function DRaddr can be any function whose possible input values are Evnt-IDs and whose possible output values are in the range of the number of dyadic routers (e.g., DRaddr(Evnt-ID) =numeric_value(Evnt-ID) modulo the number of dyadic routers). The first appropriate dyadic router is determined by the value of DRaddr applied to the Evnt-ID of the either (first or second) event in devent ("N1") and devent is sent 2a to the dyadic router corresponding to N1. The second appropriate dyadic router is determined by the value of DRaddr applied to the Evnt-ID of whichever (second or first) event in devent that was not used for the first appropriate dyadic router ("N2"). If N2 differs from N1, then devent is sent 2b to the dyadic router corresponding to N2.

Fourth, events 830 which timeout without correlating into dyadic events 840 are sent 2c, 2d by the dyadic correlators 222, 224 to a singleton handler 251 as determined by the same formula as the DRaddr function except for using the number (e.g., 2) of singleton handlers 250, 251 instead of the number of dyadic routers 230, 231, 232, 233.

The singleton handlers 250, 251 receive events that were not correlated into dyadic events by a dyadic correlator 222, 224. Upon receiving 2c, 2d an event [sevent] 830 from a dyadic correlator 222, 224, the singleton handler 251 will perform the operations listed in Appendix "C" below. A directed graph 810 for the singleton event is then generated and output 3d.

In particular, upon receiving 2c, 2d an event [sevent] 830 from a dyadic correlator 222, 224, the singleton handler 251 will, first, delete any expired events in the Evnt-ID table. Second, if the Evnt-ID of sevent is present in the Evnt-ID table, then the singleton handler has received both instances of sevent, indicating that sevent did not correlate with any other event in a dyadic correlator, so a directed graph 810 for the singleton event is then generated and output 3d. Otherwise, if the Evnt-ID of sevent is not present in the Evnt-ID table, it is added to the table.

The dyadic routers 230, 231, 232, 233 receive three types of messages as follows. First, dyadic event messages 2a, 2b from the dyadic correlators 220, 221, 222, 223, 224 containing a dyadic event 840. Second, routing notifications 3b from other dyadic routers 230, 231, 232, 233 which contain: (a) a dyadic event 840; (b) a graph correlator address; and, (c) an address version number. Third, routing updates 5b, 5c from the graph correlators 220, 221, 222, 223, 224 which are an optional optimization that (if present) contain: (a) a list of Evnt-IDs; (b) a graph correlator address or "None"; and, (c) an address version number. A description of what happens when each of these message types are received by the dyadic routers 230, 231, 232, 233 is provided below.

First, with respect to dyadic event messages 2a, 2b, upon receiving a message [devent] 2a, 2b from a dyadic correlator 220, 221, 222, 223, 224, the dyadic router 230, 231, 232, 233 will perform the operations listed in Appendix "D" below.

In particular, with respect to dyadic event messages 2a, 2b, upon receiving a message [devent] 2a, 2b from a dyadic correlator 220, 221, 222, 223, 224, the dyadic router 230, 231, 232, 233 will, first, derive a value "posn" by calculating the same simple function "DRaddr" described above on each of the Evnt-IDs devent[0] (to get N1) and devent[1] (to get N2) of devent. If N1 equals N2, then posn is "both", otherwise if N1 corresponds to the address of this dyadic router then posn is "first" otherwise posn is "last". Second, the dyadic router will look in the Evnt-ID-to-GCaddr map for recent history of the relevant parts of devent as indicated by the value of posn. Each entry in the Evnt-ID-to-GCaddr map consists of two values, a graph correlator address ("GCaddr") and an address version number ("ver"). If posn is "first" or "both", then the Evnt-ID-to-GCaddr map is searched for the Evnt-ID from devent[0] and, if present, a value H0 is set to the corresponding GCaddr and ver, otherwise H0 is set to "none". If posn is "last" or "both", then the Evnt-ID-to-GCaddr map is searched for the Evnt-ID from devent[1] and, if present, a value H1 is set to the corresponding GCaddr and ver, otherwise H1 is set to "none". H0 and H1 may be calculated in any order. Third, the dyadic router will determine a graph correlator address ("dstGCaddr") and address version ("dstver") based on the values H0 and H1 in order to decide which graph correlator 240, 241, 242 to send the devent to. If both H0 and H1 are "none", the selection of a graph correlator is performed by some uniform method (used by all dyadic routers) based only on values in devent. For example, such a uniform method might be to set dstGCaddr to the result of calculating a hash function on the two Evnt-IDs in devent and then taking the modulus with respect to the number of graph correlators. When both H0 and H1 are "none", the value dstver is set to 1. If one or both of H0 and H1 are not "none" and the GCaddr values of H0 and H1 are the same if they are both present, then dstGCaddr is set to the GCaddr of either H0 or H1, whichever is available, and dstver is set to the maximum of the available ver values of H0 and H1. If both H0 and H1 are not "none" and their GCaddr values differ, the conflicting history is resolved by setting dstGCaddr to the GCaddr of H0, and setting dstver to one more than the maximum of the two ver values from H0 and H1, and then sending a "move fragment" message 4 containing devent, dstGCaddr, and dstver to the graph correlator indicated by the GCaddr of H1. Fourth, send an "add dyadic event" message (containing devent and dstver) 3a, 3c to the graph correlator indicated by dstGCaddr. Fifth, if posn is "last", notify the dyadic router that handled the first event in devent as to where the second copy of devent was sent by sending a "routing notification" message 3b to the dyadic router indicated by calculating the value of the DRaddr function on the Evnt-ID of devent[0]. The three messages described above may be sent in any order, including at the same time if the underlying hardware permits, and at any point before or after updating the Evnt-ID-to-GCaddr map as described below. The process starting with the routing notification message 3b may apply to either the first or last event of a dyadic event simply by changing roles. Sixth, update the Evnt-ID-to-GCaddr map by adding or modifying an entry as follows. If posn is "first" and H0 is "none", then add an entry consisting of dstGCaddr and dstver to the map for the key of the Evnt-ID of devent[0]. If posn is "last" and H1 is "none", then add an entry consisting of dstGCaddr and dstver to the map for the key of the Evnt-ID of devent[1]. If posn is "both", there are four cases to consider. In the first case, where both H0 and H1 are "none", add the same entry consisting of dstGCaddr and dstver to the map for both the key of Evnt-ID of devent[0] and the key of Evnt-ID of devent[1]. In the second case, where H0 is "none" but H1 is not "none", add an entry consisting of dstGCaddr and dstver to the map for the key of the Evnt-ID of devent[0]. In the third case, where H1 is "none" but H0 is not "none", add an entry consisting of dstGCaddr and dstver to the map for the key of the Evnt-ID of devent[1]. In the fourth case, where neither H0 or H1 is "none", update the map entries for both the key of Evnt-ID of devent[0] and for the key of Evnt-ID of devent[1] to an entry consisting of dstGCaddr and dstver.

Second, with respect to routing notifications 3b, upon receiving a routing notification [devent, dstGC,dstver] 3b from another dyadic router 230, 231, 232, 233, the dyadic router 230, 231, 232, 233 will perform the operations listed in Appendix "E" below.

In particular, with respect to "routing notification" messages 3b, upon receiving a routing notification message (consisting of a devent, dstGCaddr, and dstver) 3b from another dyadic router 230, 231, 232, 233, the dyadic router will update the Evnt-ID to GCaddr map by adding or updating the entry for the key of the Evnt-ID of devent[0] as follows. If there is no entry in the Evnt-ID-to-GCaddr map for the key of the Evnt-ID of devent[0], add an entry consisting of dstGCaddr and dstver to the map for the key of the Evnt-ID of devent[0]. If there is an entry "H" in the Evnt-ID-to-GCaddr map for the key of the Evnt-ID of devent[0] and the GCaddr value of H is not the same as dstGCaddr, then send a "move fragment" message 4 consisting of devent, the GCaddr of H, and the maximum of dstver and the ver of H. In addition, update the entry in the Evnt-ID-to-GCaddr map for the key of the Evnt-ID of devent[0] to an entry consisting of the GCaddr of H and the maximum of dstver and the ver of H. Otherwise, if there is an entry "H" in the Evnt-ID-to-GCaddr map for the key of the Evnt-ID of devent[0] and the GCaddr value of H is the same as dstGCaddr, then update the entry in the Evnt-ID-to-GCaddr map for the key of the Evnt-ID of devent[0] to an entry consisting of the GCaddr of H and the maximum of dstver and the ver of H but send no message.

Third, with respect to routing updates 5b, 5c, upon receiving a routing update [evnt_list, GCaddr,ver] 5b, 5c, the dyadic router 230, 231, 232, 233 will perform the operations listed in Appendix "F" below.

In particular, with respect to "routing update" messages 5b, 5c, upon receiving a routing update message (consisting of an event-list, newGCaddr, and newver), the dyadic router 230, 231, 232, 233 will update the Evnt-ID-to-GCaddr map as follows. If the newGCaddr has a value of "none", the Evnt-ID-to-GCaddr map is updated by removing any entries for Evnt-IDs of events E in event-list. Otherwise, for each event E in event-list, if there is no entry in the Evnt-ID-to-GCaddr map for the key of the Evnt-ID of E, add an entry consisting of newGCaddr and newver for the key of Evnt-ID of E, otherwise if the ver value of the existing entry for that key is less than newver, update the existing entry for that key to be an entry consisting of newGCaddr and newver.

Graph correlators 240, 241, 242, like dyadic routers 230, 231, 232, 233, receive three types of messages as follows. First, "add dyadic event" messages 3a, 3c either directly from the dyadic correlators 230, 231, 232, 233 or forwarded from some other graph correlator 240, 241, 242, each consisting of: (a) a dyadic event 840 "devent"; and, (b) a version "ver". Second, "move fragment" messages 4 from the dyadic correlators 230, 231, 232, 233, each consisting of: (a) a dyadic event 840 "devent"; (b) a graph correlator address "dstGCaddr"; and, (c) a version "ver". Third, "receive fragment" messages 5a from other graph correlators 240, 241, 242, each consisting of: (a) a dyadic event 840 "devent"; (b) a correlation fragment which itself contains a version. Note that the move fragment 4 and receive fragment 5a messages are only sent when it is discovered that two different graph correlators 240, 241, 242, each have different fragments of a larger graph. The following describes what happens when each of these message types 3a, 3c, 4, 5a are received by the graph correlators 240, 241, 242.

With respect to dyadic event messages 3a, 3c, upon receiving an add dyadic event message [devent,ver] 3a, 3c, the graph correlator 240, 241, 242 will perform the operations listed in Appendix "G" below.

In particular, with respect to "add dyadic event" messages 3a, 3c, upon receiving an add dyadic event message 3a, 3c (consisting of "devent" and "dyer"), the graph correlator 240, 241, 242 will perform the operations described below. First, the graph correlator 240, 241, 242 will examine the forwarding map for each of the Evnt-IDs in devent to determine if the message should be forwarded to another graph correlator or processed locally. The forwarding map is keyed by Evnt-IDs and each entry in the forwarding map consists of a graph correlator address "GCaddr" and version "ver". The forwarding map is searched for the Evnt-ID from devent[0] and if present, a value F0 is set to the corresponding GCaddr and ver, otherwise F0 is set to "none". The forwarding map is searched for the Evnt-ID from devent[1] and if present, a value F1 is set to the corresponding GCaddr and ver, otherwise F1 is set to "none". If neither F0 or F1 is "none" and at least one of F0 or F1 contains a "ver" value greater that dyer, the graph correlator will forward the add dyadic message to the graph correlator addressed by whichever of F0 or F1 has the higher value for "ver" or to GCaddr of F0 if F0 and F1 have the same value of "ver". The graph correlator then updates the forwarding map so that both Evnt-IDs in devent give entries consisting of the GCaddr the message was forwarded to and the higher of the "ver" values and then does no further processing. If exactly one of F0 or F1 is "none" and the "ver" value contained in the non-"none" one is greater than dyer, the graph correlator will forward the add dyadic message to the graph correlator addressed by whichever of F0 or F1 is not "none". The graph correlator then updates the forwarding map so that both Evnt-IDs in devent give entries consisting of the GCaddr the message was forwarded to and the higher of the "ver" values and then does no further processing. If both F0 and F1 are "none", or any "ver" values found are less than dyer, any entries found in the forwarding map are removed and the message processing continues as if no entries were found. Second, when the add dyadic event is to be processed locally, the graph correlator will examine the fragments by edge map for each of the Evnt-IDs in devent to get a candidate set of correlation fragments that already contain at least one of the Evnt-IDs in devent. If the candidate set is empty (i.e., there are no candidates), the graph correlator creates a new correlation fragment with the two events from devent as the first two events in the correlation fragment and adds new entries to the graph correlator's set of correlation fragments and the fragments by edge map accordingly. If the candidate set has exactly one correlation fragment entry, that correlation fragment is extended by whichever event in devent is missing (if any) and the fragments by edge map is updated accordingly. Otherwise, the candidate set has exactly two correlation fragment entries, so the graph correlator will join the two correlation fragments into one at the node common to both events in devent and update the graph correlator's set of correlation fragments and the fragments by edge map accordingly. Third, the graph correlator will recalculate the signature for any changed correlation fragments and compare against the set of target signatures. If any target signature is matched by the recalculated fragment signatures, a directed graph 810 for the correlation fragment is then generated and output 6c.

With respect to move fragment messages 4, upon receiving a move fragment message [graft_devent,ver,otherGC] 4, the graph correlators 240, 241, 242 will perform the operations listed in Appendix "H" below.

In particular, with respect to "move fragment" messages 4, upon receiving a move fragment message (consisting of "gdevent", "gver", and "otherGCaddr"), the graph correlator will perform the operations described below. First, find the target correlation fragment "T" by examining the fragments by edge map for the key of Evnt-ID of gdevent[1]. If no such fragment is found because the appropriate add dyadic event message has not yet arrived, create a new correlation fragment for T from gdevent. Second, add all the target correlation fragment T's Evnt-IDs to the forwarding map with entries consisting of otherGCaddr and gver. Third, remove all the target correlation fragment T's Evnt-IDs (and thus any references to T) from the fragments by edge map. Fourth, send routing update messages 5b, 5c to any dyadic routers managing event history for all the Evnt-IDs in the target correlation fragment T, where the dyadic routers to receive routing update messages are determined by calculating the DRaddr function described above on each of the Evnt-IDs in T. Fifth, set the version contained in the target correlation fragment T to gver. Sixth, send a receive fragment message 5a consisting of gdevent and the target correlation fragment T to the graph correlator addressed by otherGCaddr.

With respect to receive fragment messages 5a, upon receiving a receive fragment message [graft_devent,target_frag] 5a, the graph correlators 240, 241, 242 will perform the operations listed in Appendix "I" below.

In particular, with respect to "receive fragment" messages 5a, upon receiving a receive fragment message (consisting of a dyadic event gdevent and a correlation fragment T), the graph correlator will perform the operations described below. First, remove any entries in the forwarding map for any of the Evnt-IDs in either gdevent or T. Second, find the local correlation fragment "L" by examining the fragments by edge map for the key of Evnt-ID of gdevent[0]. If no such fragment is found because the appropriate add dyadic event message has not yet arrived, create a new correlation fragment for L from gdevent. Third, add all the events (edges) and their corresponding nodes from the correlation fragment T to the correlation fragment L and update the fragments by edge map to reflect the new edges in the local correlation fragment L. Fourth, recalculate the signature for the correlation fragment L and compare it against the set of target signatures. If any target signature is matched by the recalculated fragment signature, a directed graph 810 for the correlation fragment L is then generated and output 6c.

The graph correlators 240, 241, 242 combine the correlation fragments to generate and output 6c the final directed graph 810. The directed graph 810 may be presented to a user on the display 340 of the data processing system 300 or otherwise used for application performance monitoring or other applications.

Figure 3:
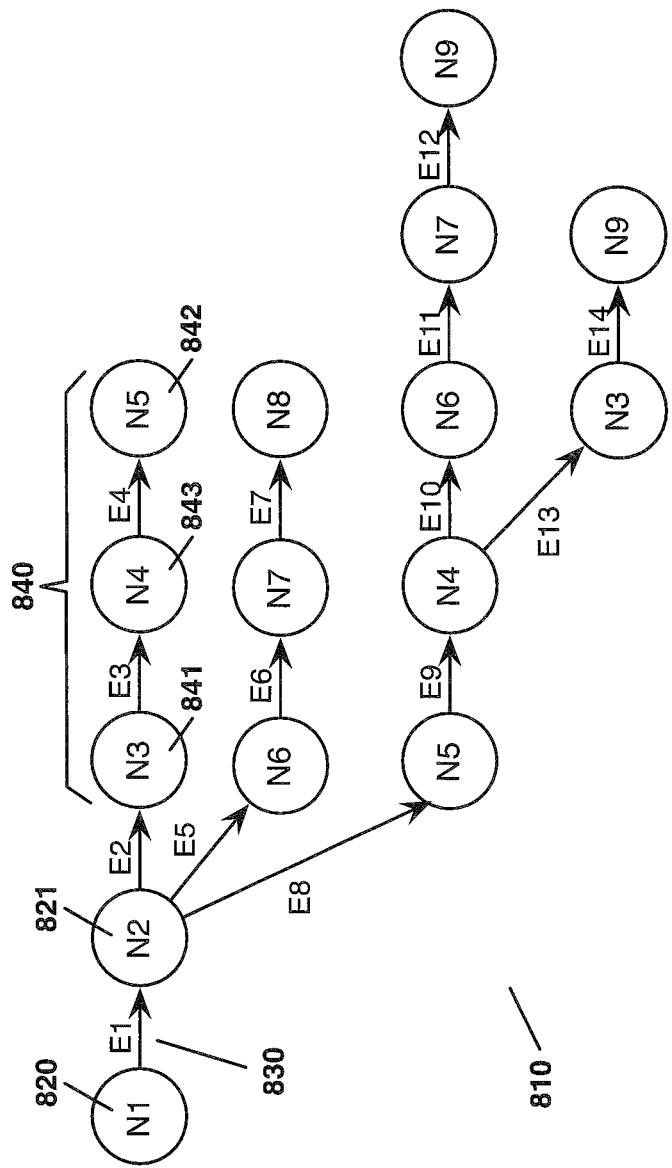
FIG. 3 is a block diagram illustrating an exemplary transaction in an application in accordance with an embodiment of the invention.

FIG. 3 is a block diagram illustrating an exemplary directed graph 810 for a transaction 800 in an application 801 in accordance with an embodiment of the invention. According to one embodiment, the invention may be used in an application performance monitoring ("APM") system 400 (see FIG. 4). One aspect of APM involves monitoring the data flow between applications so as to be able to detect performance related issues and to quickly determine their causes. In such a system, each transaction request may result in many downstream applications contributing their portion of the solution. For example, an end user on a browser may issue a request to a remote web server, which may in turn communicate with multiple downstream servers to satisfy parts of the request, which may in their turn communicate with multiple servers downstream to them (e.g., databases), etc. Thus, a single client initiated transaction may spawn a far-reaching series of downstream transactions. This process may be illustrated by a directed graph 810 such as that shown in FIG. 3. Note that a drawing of a directed graph should not be confused with the directed graph itself (which is an abstract, non-visual structure) as there are several ways to structure the drawing.

In the directed graph 810 of FIG. 3, each different processing node 820 is represented by a reference number "Nx" (where x=1, 2, 3, . . . ). These nodes represent the different application components 820 involved in the transaction 800. Note that some application components (e.g., "N3", "N4", "N5", "N6", "N7", and "N9") 820 are involved multiple times at different points in the transaction 800. This is common in cases where there are "utility" applications such as database servers, multiplexors, and message/transaction routers. For example, each application component 820 may be a data processing system 300 similar to that shown in FIG. 1.

The "Ey" (where y=1, 2, 3 . . . ) reference numbers in the directed graph 810 of FIG. 3 represent events 830. In this example, the events represent the transaction flow (i.e., the graph edges 830) between the nodes 820. Note that each event 830 has a distinct identifier (e.g., "E1"). This identifier identifies the event as a combination of the data within the transaction and the time at which it occurred.

Monitoring a transaction 800 such as that represented by the directed graph 810 drawing of FIG. 3 generally involves obtaining network traces at different points within the transaction network so as to intercept the different events (e.g., E1, E2, etc.). Because most transaction systems are both distributed and large, there may be many such collection points. The problem, then, is to create the entire graph 810 in real time without having to send all the data back to a central database or processor, which would likely be overwhelmed. The following describes how the invention may be applied in this environment to address this problem.

Figure 4:
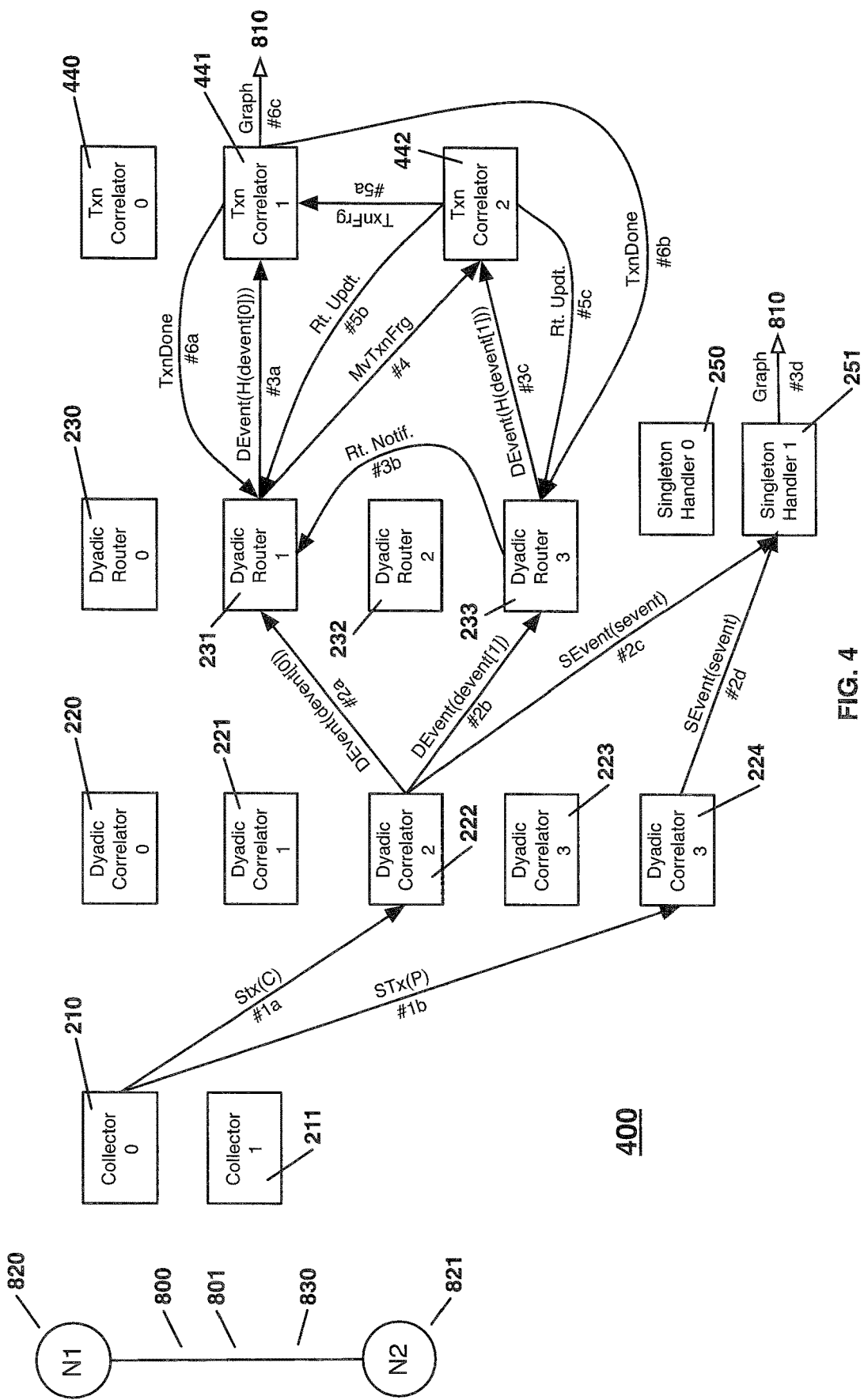
FIG. 4 is a block diagram illustrating an application performance monitoring ("APM") system in accordance with an embodiment of the invention.

FIG. 4 is a block diagram illustrating an exemplary application performance monitoring ("APM") system 400 in accordance with an embodiment of the invention. FIG. 4 illustrates how the various event monitoring components 210, 220, 230, 240, 250 of the event processing system 200 of FIG. 2 are applied to monitoring an application 800 represented by the directed graph 810 drawing of FIG. 3. The system 400 of FIG. 4 operates as follows.

First, an event (a message or transaction) 830 is detected by a collector 210 that monitors the data flow between applications. In the case of network monitoring, a group of related packets occurring on a single link of the network (e.g., an application request and response along with related lower layer protocol messages, network acknowledgments, etc.) may be correlated together into a "service event" (sometimes referred to as a "service transaction"). The collector 210 associates timestamps with this event 830. In this example, events 830 such as service transactions may have multiple timestamps associated with them (i.e., to indicate the start time, the end time, and the times of any other low level events being combined into the service transaction).

Second, each event (e.g., service event) 830 is then sent to two downstream dyadic correlators 222, 224 based on the node endpoints for that event. At this point, the dyadic correlators 222, 224 will be receiving events of type "Nx-Ey-Nz" where "E" indicates an event 830 and "N" indicates the nodes 820 that initiated and terminated it.

Third, the previous step results in one and only one of the dyadic correlators 222, 224 receiving events 841 that terminate at a particular node 843 and the corresponding events 842 that initiate at the same node 843 (i.e., in the case of "N4" one dyadic correlator will end up receiving both "N3-E3-N4" and "N4-E4-N5" where the event is read from left to right). At this point, processing (not described herein) is performed to correlate the two events based on knowledge of how the node ("N4" in this case) mutates the event. The result is a dyadic event 840 of the form "N3-E3-N4-E4-N5". This process may be thought of as "two-link correlation". Any dyadic events 840 that are created are sent on to two dyadic routers 231, 233 (one associated with handling "E3", the other with handling "E4").

Fourth, up to half of the dyadic correlators 220, 221, 222, 223, 224 will not receive matching events 841, 842 and so cannot create dyadic events 840. These events will be forwarded on to a singleton handler 251 which determines (as described above) if the event is a valid single link event (and so needs to be output 3d as an already complete graph 810) or if it has already been combined into a dyadic event (and so needs to be discarded).

Fifth, the dyadic routers 231, 233 are responsible for passing each of the dyadic events 840 on to a transaction correlator 440, 441, 442, which are similar to the graph correlators 240, 241, 242 or FIG. 2. The choice of which transaction correlator 440, 441, 442 is determined by examining the local "recent history" stored within the dyadic router 231, 233 as described above.

Sixth, a transaction correlator 441 creates the directed graph 810 of the entire multi-link transaction 800. As described above, this may require moving graph fragments (i.e., transaction fragments) between transaction correlators 441, 442 so as to get all related fragments within a single transaction correlator 441. As an optional part of this step, the history stored within the dyadic routers 231, 233 is updated by update messages from the transaction correlators 441, 442 so that future routing requires less movement of the fragments.

Seventh, the completed graph 810 is output 6c by the appropriate transaction correlator 441 and a message 6a, 6b is optionally sent back to the related dyadic routers 231, 233 so that any remaining fragments may be deleted.

Note that complete event details (e.g., such as application message details, message content, etc.) would not normally be sent through the systems 200, 400 shown in FIGS. 2 and 4. Rather, only the information or event information required for correlation and for matching endpoints would be sent.

Figure 5:
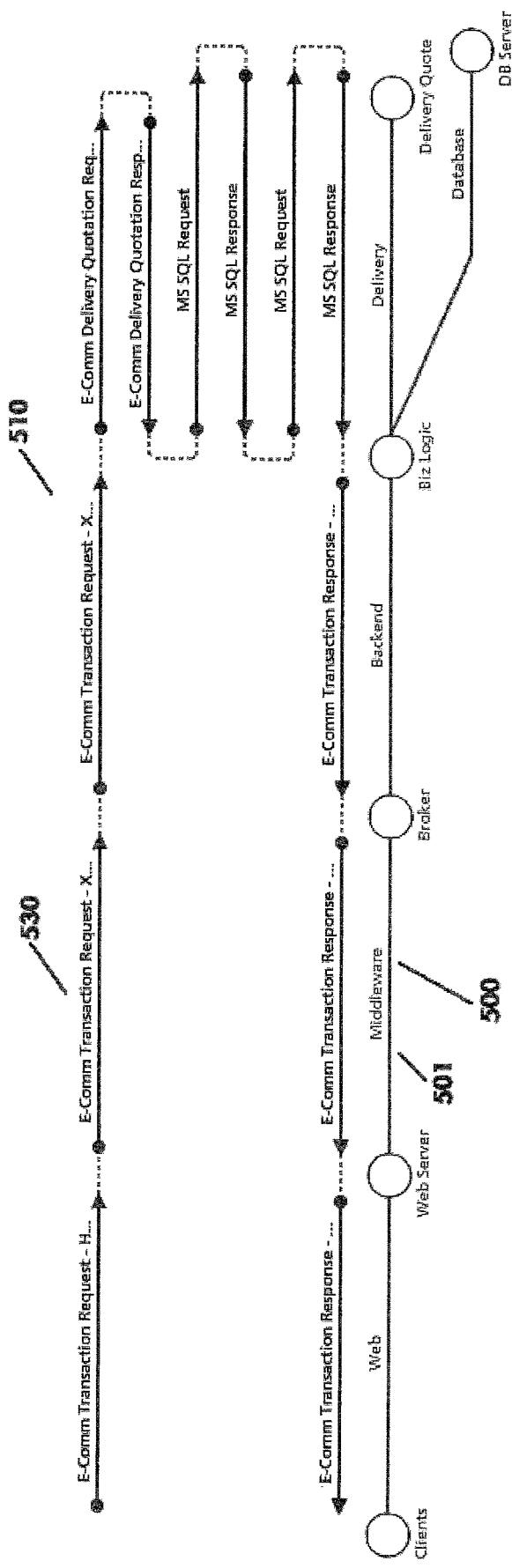
FIG. 5 is a block diagram illustrating an exemplary transaction in an application in accordance with an embodiment of the invention.
Figure 6:
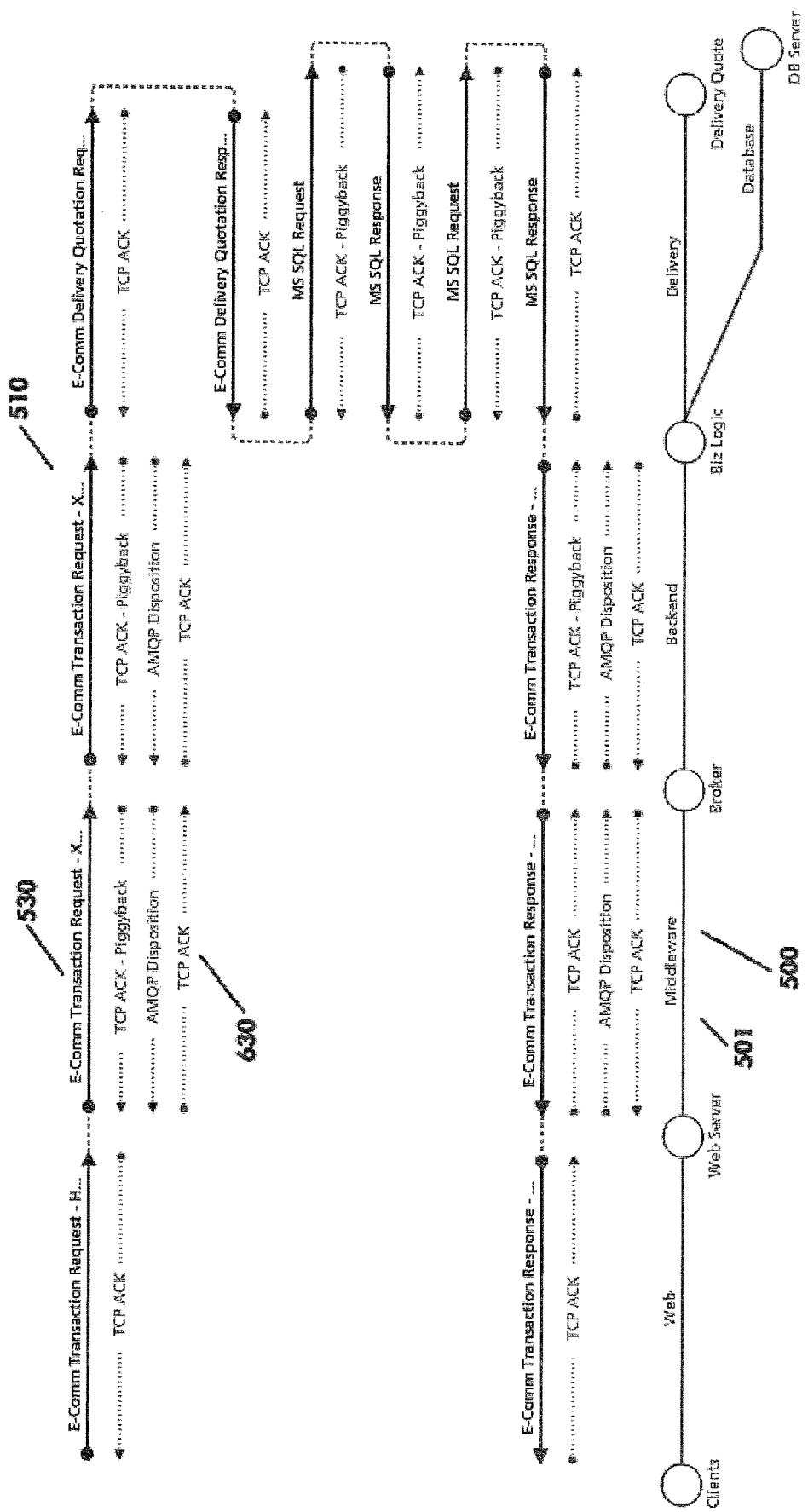
FIG. 6 is a block diagram illustrating the exemplary transaction in an application of FIG. 5 including underlying events in accordance with an embodiment of the invention; and, FIG. 7 is a flow chart illustrating operations of modules within a data processing system for generating a directed graph for a transaction in an application, in accordance with an embodiment of the invention.

FIG. 5 is a block diagram illustrating an exemplary transaction 500 in an application 501 in accordance with an embodiment of the invention. And, FIG. 6 is a block diagram illustrating the exemplary transaction 500 in an application 501 of FIG. 5 including underlying events 630 in accordance with an embodiment of the invention. FIGS. 5 and 6 show two example outputs from the APM system 400 of FIG. 4. FIG. 5 shows the directed graph 510 created by combined "service transaction" events 530. And, FIG. 6 shows the same directed graph 510 with underlying events 630 within the "service transaction" events 530 exposed.

The above embodiments may contribute to an improved method and system for generating directed graphs and may provide one or more advantages. First, a method for discovering and assembling directed graphs 810 that may be applied in environments where low latency or near real-time operation is a requirement is provided. Second, the method allows for horizontal scaling (i.e., "scaling out") of the graph assembly process so that more processors may be added as more graphs must be analyzed. Third, the method is a low latency technique allowing for real time assembly of directed graphs 810. Fourth, the method allows for examination of individual transactions as opposed to providing a statistical result. Fifth, the method does not require modification of event data streams to inject "tags". Sixth, the method reduces problematic security, storage, and retrieval issues resulting from storing large amounts of data in databases. Seventh, the method is usable in large processing environments where there is no ability to divide the problem into non-intersecting components. Eighth, the method provides for exact, as opposed to probabilistic, matches resulting in the ability to study individual flows as opposed to just statistical flows. Ninth, the method uses a deterministic (and small) number of steps to arrive at the final graph. And, tenth, the method does not require modification of instrumentation of the system or application 801 generating the events 830. Rather, the method allows the monitored system or application 801 to be observed passively.

Aspects of the above described method may be summarized with the aid of a flowchart.

Figure 7:
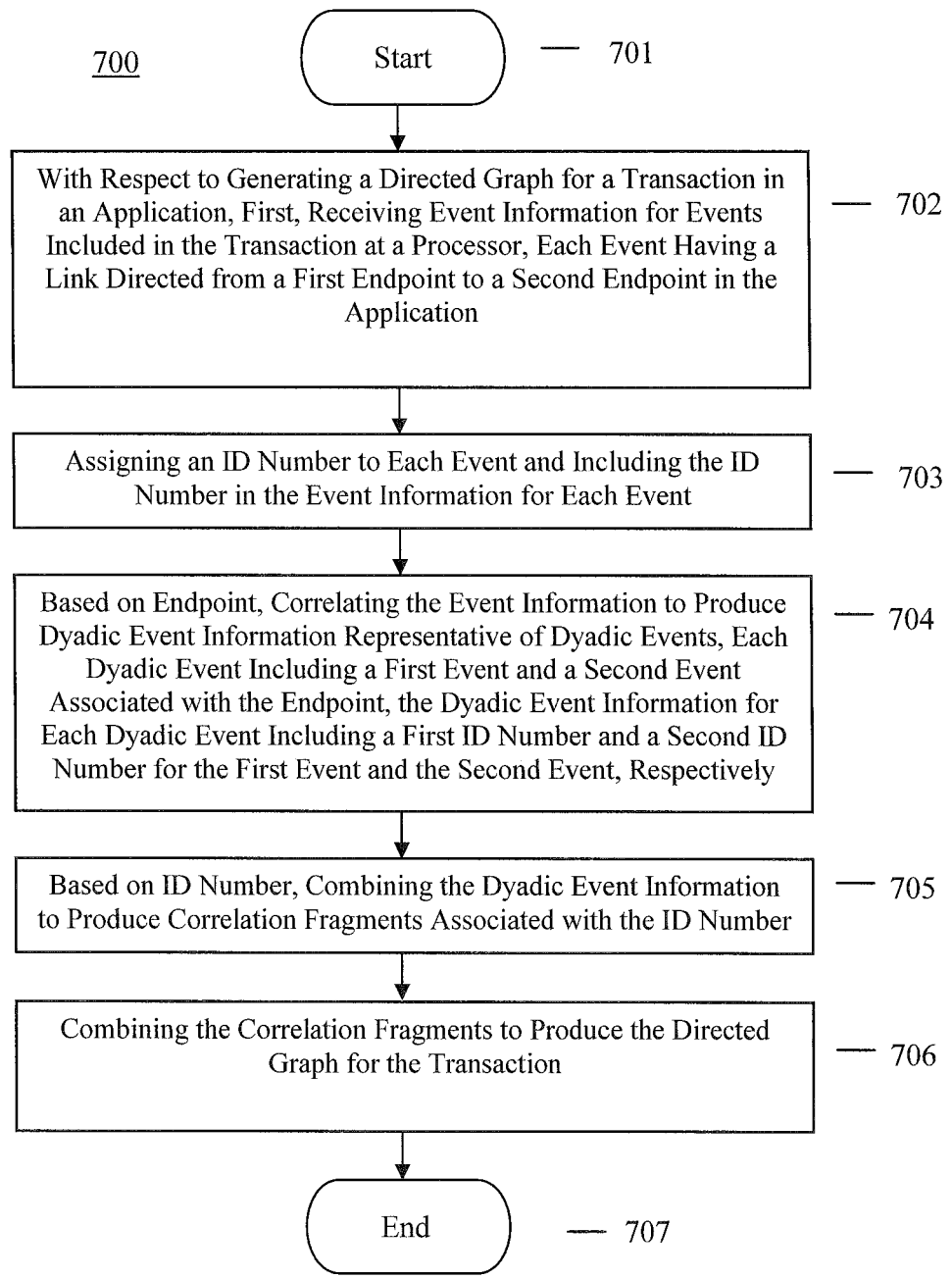

FIG. 7 is a flow chart illustrating operations 700 of modules (e.g., 331) within a data processing system (e.g., 300) for generating a directed graph 810 for a transaction 800 in an application 801, in accordance with an embodiment of the invention.

At step 701, the operations 700 start.

At step 702, event information for events 830 included in the transaction 800 is received at a processor 320, each event 830 having a link 830 directed from a first endpoint 820 to a second endpoint 821 in the application 801.

At step 703, an identification ("ID") number is assigned to each event 830 and the ID number is included in the event information for each event 830.

At step 704, based on endpoint (e.g., 820, 821), the event information is correlated to produce dyadic event information representative of dyadic events 840, each dyadic event 840 including a first event 841 and a second event 842 associated with the endpoint 843, the dyadic event information for each dyadic event 840 including a first ID number and a second ID number for the first event 841 and the second event 842, respectively.

At step 705, based on ID number (e.g., first ID number, second ID number), the dyadic event information is combined to produce correlation fragments associated with the ID number.

At step 706, combining the correlation fragments are combined to produce the directed graph 810 for the transaction 800.

At step 707, the operations 700 end.

In the above method, the event information may be received by one or more event collectors 210 coupled to the application 801. The ID number for each event 830 may be assigned at the one or more event collectors 210. The event information may be correlated at one or more dyadic correlators 220 coupled to the one or more event collectors 210. The dyadic event information may be combined at one or more graph correlators 240 coupled to the one or more dyadic correlators 220 by way of one or more dyadic routers 230. The method may further include selecting among the one or more dyadic correlators 220 based on endpoint 843. The method may further include selecting among the one or more dyadic routers 230 based on ID number. The method may further include selecting among the one or more graph correlators 240 based on history information pertaining to where dyadic event information associated with the ID number was previously sent. The history information may be stored in the one or more dyadic routers 230. And, the method may further include outputting the directed graph 810 to an application performance monitoring application.

According to one embodiment, each of the above steps 701-707 may be implemented by a respective software module 331. According to another embodiment, each of the above steps 701-707 may be implemented by a respective hardware module 321. According to another embodiment, each of the above steps 701-707 may be implemented by a combination of software 331 and hardware modules 321.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or computer program product including program instructions recorded thereon, may direct the data processing system 300 to facilitate the practice of the method of the invention. It is understood that such apparatus, products, and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product or computer program product according to one embodiment of the invention. This computer software product or computer program product can be loaded into and run by the data processing system 300. Moreover, the sequences of instructions which when executed cause the method described herein to be performed by the data processing system 300 can be contained in an integrated circuit product (e.g., a hardware module or modules 321) which may include a coprocessor or memory according to one embodiment of the invention. This integrated circuit product can be installed in the data processing system 300.

The embodiments of the invention described above are intended to be exemplary only. Those skilled in the art will understand that various modifications of detail may be made to these embodiments, all of which come within the scope of the invention.

Appendix "A"

If posn is NOT first then:
  p = producer(cur_evnt)
  candidates = evnts_by_consumer(p)
  For each prv_evnt in candidates:
    If the other data in the prv_evnt and cur_evnt implies bridging:
      Create a new Dyadic Event <pry_evnt,cur_evnt>
      Send it to the Dyadic Routers as described below.
If posn is NOT last then:
  c = consumer(cur_evnt)
  candidates = evnts_by_producer(c)
  For each nxt_evnt in candidates:
    If the other data in the cur_evnt and nxt_evnt implies bridging:
      Create a new Dyadic Event <cur_evnt,nxt_evnt>
      Send it to the Dyadic Routers as described below.

Appendix "B"

Obtain a number N1 = DRaddr(of the Evnt-ID of the first event of devent)
Obtain a number N2 = DRaddr(of the Evnt-ID of the last event of devent)
If N1 ≠ N2:
  Send [devent] to Dyadic Router N1
  Send [devent] to Dyadic Router N2
Otherwise if N1 = N2:
  Send [devent] to Dyadic Router N1

Appendix "C"

Delete any expired events in the Evnt-ID table.
If the Evnt-ID of sevent is still in the Evnt-ID table:
  Signal a graph is found (i.e., a Singleton).
Else add the Evnt-ID to the table.

Appendix "D"

Derive posn as follows:
  Calculate DRaddr of the Evnt-ID of devent[0]
  Calculate DRaddr of the Evnt-ID of devent[1]
  if both DRaddr's are the same:
    posn = "both"
  else if the first DRaddr is the same as this Dyadic Router's address:
    posn = "first"
  else:
    posn = "last"
Look for history of the relevant parts of devent:
  If posn is first or both:
    Look for H0 = the history for the first Evnt in devent in the Evnt-ID to GCaddr map
    (if any).
  If posn is last or both:
    Look for H1 = the history for the last Evnt in devent in the Evnt-ID to
    GCaddr map (if any).
Decide which Graph Correlator (Gc) to send devent to based on history (H0, H1) if
available, or if not available, then by some uniform method (used by all Dyadic Routers)
based only on values in devent.
  If history is not available the selection of a Graph Correlator might be done by
  hashing together the two Evnt-IDs in the devent, and then taking the modulus with
  respect to the number of Graph Correlators as follows.
    dstGC = (hash(Evnt-ID(devent[0])) ^ hash(Evnt_ID(devent[1]))) % num_gc's
    dstver = 1
When history is available and not conflicting (i.e. H0 alone, H1 alone, or both present but
address(H0) = address(H1), send [devent] to the Graph Correlator indicated by the history.
  dstGC = address(H0) if available, otherwise address(H1)
  dstver = the maximum of the available versions of H0 or H1
When conflicting history is found (i.e. addr(H0 ≠ addr(H1)):
  dstGC = address(H0) (the Graph Correlator that last received the first part of devent)
  dstver = max(version(H0),version(H1) + 1
  Send a "move fragment" message containing devent and ver to the Graph Correlator
  that last received the last part of devent (i.e. address(H1)).
If dstGC ≠ "None":
  send(dstGC,[devent,dstver])
(Note: The <dstGC,dstver> pair will be used for updating the history map below.)
Update the "history" map:
  If posn = "first" and H0 is not available:
    add history[devent[0]] = <dstGC,dstver>
  If posn = "last" and H1 is not available:
    add history[devent[1]] = <dstGC,dstver>
  If posn = "both", then there are 4 cases of history lookup:
    H0 and H1 already available:
      if H0 ≠ H1 then change history[devent[1]] = <dstGC,dstver>
      Make sure history[devent[0]] = <dstGC,dstver>(i.e. update version)
    H0 only available AND posn ≠ "first":
      Add history[devent[1]] = <dstGC,dstver>
    H1 only available AND posn != "last":
      Add history[devent[0]] = <dstGC,dstver>
    neither H0 or H1 available:
      If posn ≠ "last", add history[devent[0]] = <dstGC,dstver>
      If posn ≠ "first", add history[devent[1]] = <dstGC,dstver>

-continued

| Appendix "D" |
|---|
| Notify the Dyadic Router that handled the first event as to where the second event was sent.<br>    If posn = "last": (Dyadic Router is only handling devent[1])<br>        Send routing notification([devent, dstGC, dstver]) to the Dyadic Router<br>        whose address is DRaddr(Evnt-ID of devent[0]). |

| Appendix "E" |
|---|
| Look up the history of the first part of the devent:<br>    H = history(Evnt-ID of devent[0])<br>If there is no such history: (i.e. H is not available)<br>    add history(Evnt-ID of devent[0]) = <dstGC,dstver><br>Else if there is history available:<br>    if address(H) ≠ dstGC then the downstream part needs to move to the<br>    Graph Correlator that already has the upstream part.<br>        Send a "move fragment" message containing devent and<br>        max(version(H),dstver) to the dstGC.<br>    Ensure version(H) = max(version(H),dstver) |

| Appendix "F" |
|---|
| For each evnt in evnt_list:<br>    H = history[evnt]<br>    If H is not available:<br>        Add history[evnt] = <GCaddr,ver><br>    Else if version(H) < ver:<br>        address(H) = GCaddr<br>        version(H) = ver |

| Appendix "G" |
|---|
| Examine the forwarding map for each of the Evnt-IDs in devent:<br>    F0 = forwarding(devent[0])<br>    F1 = forwarding(devent[1])<br>    There are 3 cases of forwarding information availability.<br>        When both F0 and F1 are available:<br>            Forward the add Dyadic Event message to the Graph Correlator<br>            addressed in whichever of F0 or F1 has the highest version number,<br>            or F0 if they are equal.<br>            Update the forwarding map for both parts of devent to have the<br>            address and version of whichever has the highest version number.<br>            Stop processing the message.<br>        When exactly one of F0 or F1 is available:<br>            Add an entry for the missing one that matches the one found.<br>            Forward the add Dyadic Event message to the Graph Correlator<br>            addressed in whichever of F0 or F1 was available.<br>            Stop processing the message.<br>        When neither is available, there is no forwarding to do, continue on with<br>        adding devent.<br>Examine the fragments by edge map to get a set of Correlation Fragment candidates that<br>already contain at least one of the Evnt-IDs in devent<br>    If there are 0 candidates, then start a new Correlation Fragment with devent as the<br>    first two Evnt's in it, and update the set of Correlation Fragments and the fragments<br>    by edge map accordingly.<br>    If there is 1 candidate:<br>        If both Evnt's are already present in the candidate fragment then devent is a<br>        duplicate and can be ignored.<br>        Otherwise extend the candidate by whatever Evnt-ID is not already present,<br>            and update the fragments by edge map accordingly.<br>    Otherwise there are 2 candidates so join the two into one fragment at the node that is<br>    common to both Evnt's in devent, and update the set of Correlation Fragments and<br>    the fragments by edge map accordingly.<br>Recalculate the Signature for any changed fragments and compare against the set of target<br>Signatures.<br>    Signal if any match is found. |

| Appendix "H" |
| --- |
| Find the target fragment (containing graft_devent[1]) by examining its fragments by edge map.
If not found (because the add Dyadic Event message has not yet arrived), create a new fragment containing only Evnt's from graft_devent.
Do all the required routing changes for the target fragment:
   Add all the target fragment Evnt's to the forwarding map with <otherGC,ver> entries.
   Remove all the target fragment Evnt's (and thus any reference to the target fragment) from the fragments by edge map.
   Send routing update messages to any Dyadic Routers managing event history for Evnt's in the target fragment, where the Dyadic Routers are determined by examining the Evnt-ID's using the DRaddr function.
Send a receive fragment message [graft_devent,target fragment] to otherGC's. |

| Appendix "I" |
| --- |
| Undo any forwarding for all Evnt's in either graft_devent or target_frag (i.e remove any matching entries in the forwarding map).
Find the local fragment (containing graft_devent[0]) by examining the fragments by edge map.
If not found (because the add Dyadic Event message has not yet arrived), create a new local
fragment containing only Evnt's from graft_devent.
Add all the edges (Evnt's) and nodes from target_frag to the local fragment.
Update the fragments by edge map to reflect the new edges in the local fragment.
Recalculate the Signature of the local fragment and compare against the set of target Signatures, signaling any match found. |

What is claimed is:

1. A method for generating a directed graph for a transaction in an application by an event processing system to improve operation thereof, the method comprising:

receiving event information for events included in the transaction at a processor within the event processing system, each event having a link directed from a first endpoint to a second endpoint in the application, each event including other data required for downstream processing and display, the event information including only information required for correlation and for matching endpoints;

assigning an identification ("ID") number to each event and including the ID number in the event information for each event;

based on matching endpoint alone, correlating the event information using the other data required for downstream processing and display to produce dyadic event information representative of dyadic events, each dyadic event including a first event and a second event associated with the endpoint, the dyadic event information for each dyadic event including a first ID number and a second ID number for the first event and the second event, respectively;

based on matching ID number alone, combining the dyadic event information to produce correlation fragments associated with the ID number, wherein only one type of ID number is used, and wherein the combining is performed without using a conditional expression for combining ID numbers;

combining the correlation fragments to produce the directed graph for the transaction, wherein the transaction is a single transaction and only the correlation fragments relating to the single transaction are combined; and, outputting the directed graph to an application performance monitoring system to improve operation thereof;

wherein the method is low latency allowing for real-time assembly of the directed graph.

2. The method of claim 1 wherein the receiving of the event information is by one or more event collectors coupled to the application, wherein each of the one or more event collectors is a data processing system, and wherein the one or more event collectors are widely distributed within the event processing system.

3. The method of claim 2 wherein the assigning of the ID number for each event is performed at the one or more event collectors.

4. The method of claim 3 wherein the correlating of the event information is performed at one or more dyadic correlators coupled to the one or more event collectors, wherein each of the one or more dyadic correlators is a data processing system, and wherein the one or more dyadic correlators are regionally distributed within the event processing system.

5. The method of claim 4 wherein the combining of the dyadic event information is performed at one or more graph correlators coupled to the one or more dyadic correlators by way of one or more dyadic routers, wherein each of the one or more graph correlators is a data processing system, wherein each of the one or more dyadic routers is a data processing system, and wherein the one or more graph correlators and the one or more dyadic routers correlators are centrally located within the event processing system.

6. The method of claim 4 and further comprising selecting among the one or more dyadic correlators based on endpoint.

7. The method of claim 5 and further comprising selecting among the one or more dyadic routers based on ID number.

8. The method of claim 5 and further comprising selecting among the one or more graph correlators based on history information pertaining to where dyadic event information associated with the ID number was previously sent.

9. The method of claim 8 wherein the history information is stored in the one or more dyadic routers.

10. An event processing system for generating a directed graph for a transaction in an application, the directed graph for improving operation of the event processing system, the event processing system comprising:
 a processor coupled to memory and an interface to the application; and,
 at least one of hardware and software modules within the memory and controlled or executed by the processor, the modules including:
 a module for receiving event information for events included in the transaction, each event having a link directed from a first endpoint to a second endpoint in the application, each event including other data required for downstream processing and display, the event information including only information required for correlation and for matching endpoints; a module for assigning an ID number to each event and including the ID number in the event information for each event;
 a module for, based on matching endpoint alone, correlating the event information using the other data required for downstream processing and display to produce dyadic event information representative of dyadic events, each dyadic event including a first event and a second event associated with the endpoint, the dyadic event information for each dyadic event including a first ID number and a second ID number for the first event and the second event, respectively;
 a module for, based on matching ID number alone, combining the dyadic event information to produce correlation fragments associated with the ID number, wherein only one type of ID number is used, and wherein the combining is performed without using a conditional expression for combining ID numbers;
 a module for combining the correlation fragments to produce the directed graph for the transaction, wherein the transaction is a single transaction and only the correlation fragments relating to the single transaction are combined; and,
 a module for outputting the directed graph to an application performance monitoring system to improve operation thereof;
 wherein the event processing system is low latency allowing for real-time assembly of the directed graph.

11. The event processing system of claim 10 wherein the module for receiving the event information is one or more event collectors coupled to the application, wherein each of the one or more event collectors is a data processing system, and wherein the one or more event collectors are widely distributed within the event processing system.

12. The event processing system of claim 11 wherein the module for assigning the ID number for each event is included in the one or more event collectors.

13. The event processing system of claim 12 wherein the module for correlating the event information is included in one or more dyadic correlators coupled to the one or more event collectors, wherein each of the one or more dyadic correlators is a data processing system, and wherein the one or more dyadic correlators are regionally distributed within the event processing system.

14. The event processing system of claim 13 wherein the module for combining the dyadic event information is included in one or more graph correlators coupled to the one or more dyadic correlators by way of one or more dyadic routers, wherein each of the one or more graph correlators is a data processing system, wherein each of the one or more dyadic routers is a data processing system, and wherein the one or more graph correlators and the one or more dyadic routers correlators are centrally located within the event processing system.

15. The event processing system of claim 13 and further comprising a module for selecting among the one or more dyadic correlators based on endpoint.

16. The event processing system of claim 14 and further comprising a module for selecting among the one or more dyadic routers based on ID number.

17. The event processing system of claim 14 and further comprising a module for selecting among the one or more graph correlators based on history information pertaining to where dyadic event information associated with the ID number was previously sent.

18. The event processing system of claim 17 wherein the history information is stored in the one or more dyadic routers.

* * * * *